Jan. 23, 1968　　　　　J. H. EWING　　　　　3,364,812
CONTINUOUS FLOW TURBIDIMETER
Filed Sept. 5, 1963　　　　　　　　　　　　　2 Sheets-Sheet 1
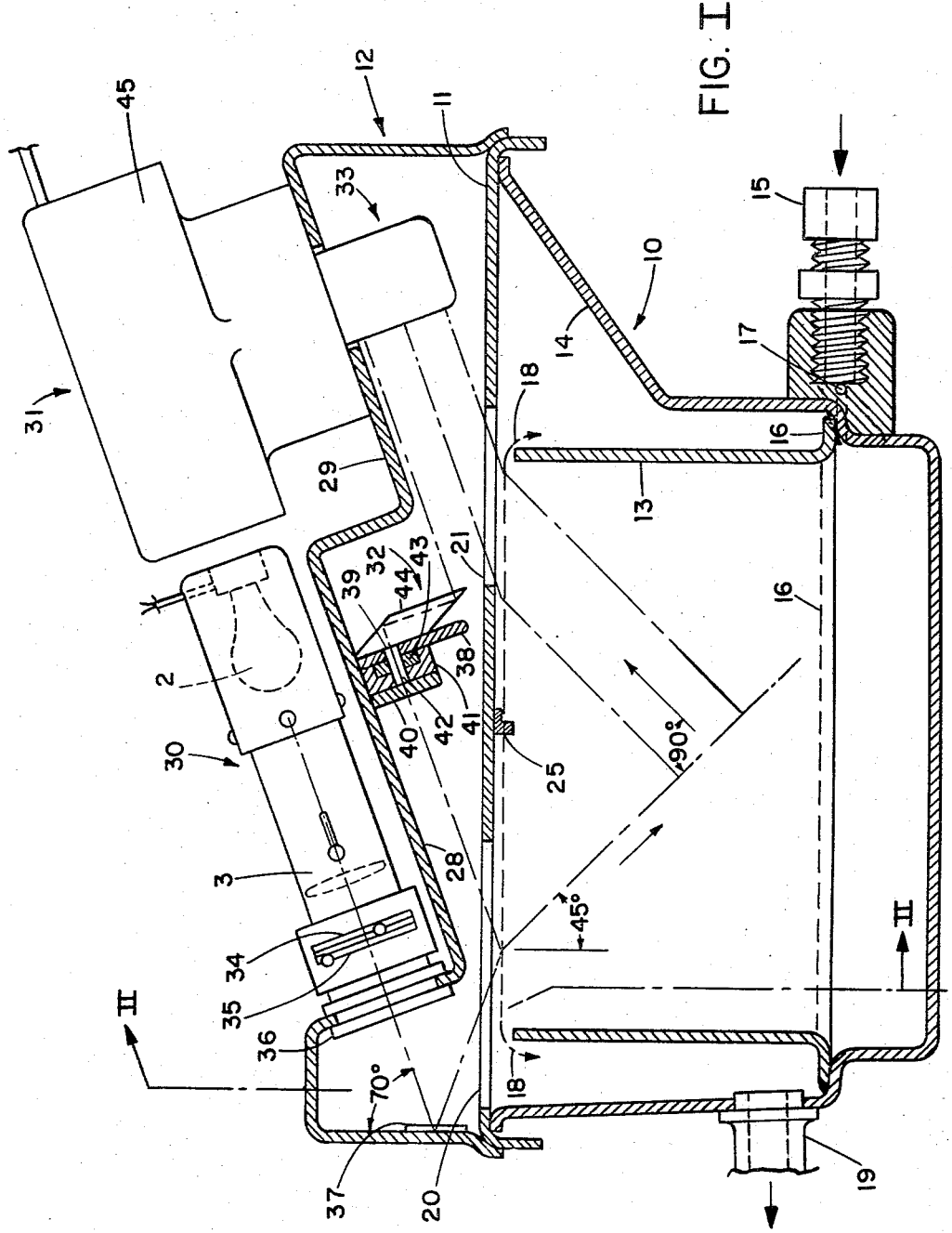
INVENTOR.
JAMES H. EWING
BY
Lawrence H. Patton
AGENT Jan. 23, 1968  J. H. EWING  3,364,812
CONTINUOUS FLOW TURBIDIMETER
Filed Sept. 5, 1963  2 Sheets-Sheet 2
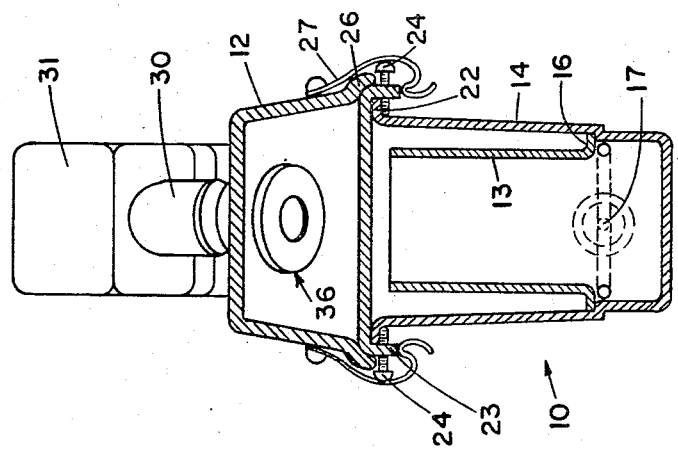
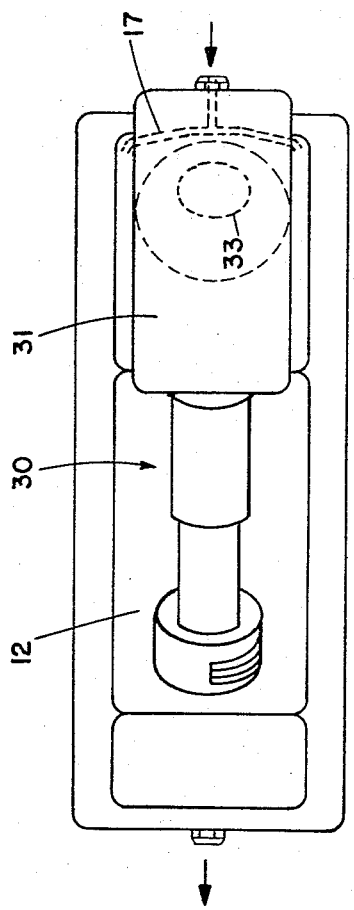
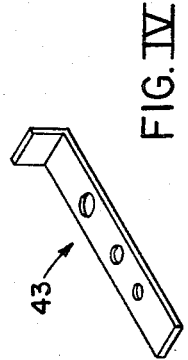
INVENTOR.
JAMES H. EWING
BY
Lawrence H. Palton
AGENT & # United States Patent Office 3,364,812
Patented Jan. 23, 1968

3,364,812
CONTINUOUS FLOW TURBIDIMETER
James H. Ewing, South Easton, Mass., assignor to The Foxboro Company, Foxboro, Mass., a corporation of Massachusetts
Filed Sept. 5, 1963, Ser. No. 306,923
1 Claim. (Cl. 88—14)

This invention relates to the measurement of the cloudiness of liquids. It is particularly concerned with modern requirements for greater accuracy of turbidity measurements and extends to measurements in the low ranges of turbidity. Such low ranges may, for example, be of the order of 0 to .5 turbidity units (t.u.) and 0 to 25 turbidity units (t.u.), where a turbidity unit is essentially equated to one part per million of suspended particles in a liquid.

It is important in such low range measurements to achieve and utilize a large measurement area deep in the liquid to be measured. This invention provides means to accomplish this new and novel result.

Turbidity measurements basically consist of shining a light into a liquid, and in one form or another, measuring the light that gets through the liquid. Turbidimetric measurement is ordinarily a straight line arrangement of light through the liquid to a photocell to measure the remainder of the light after a part of it has been scattered in the liquid by the turbidity particles therein. This is indirect since zero turbidity results in maximum measurement, that is, essentially all the light gets to the photocell.

On the other hand, nephelometric measurement is direct, as the side measurement of light scattered from the turbidity particles, usually at 90°±10° with respect to the line of travel of the light beam. Thus, at zero turbidity the measurement is also zero because there are no particles to produce light scattering.

The nephelometric measurement is thus found to be advantageous and is the preferred form of this invention.

It is important that no light beam windows be used in the turbidity tank or cell because of the errors introduced by the variations in dirt or film collections caused by contact with the liquid under measure. This is especially pertinent in a continuous, flowing liquid measurement.

This invention includes such continuous measurement, and provides the new and novel combination of a light beam that enters the liquid from above and through the top, open surface of the liquid to extend deep thereinto, and dispersed light, from this beam deep within the liquid, which exits upward through the top open surface of the liquid, to be registered on the photocell.

As a specific embodiment, this invention provides both a light source and a photocell located above an open-top tank.

This invention, further, provides new and novel means for span and range determination of the turbidimeter.

Color filter means is provided, and a weir system is included to provide constant liquid level for continuous measurement.

It is an object of this invention to provide a new, novel and improved turbidimeter.

Other objects and advantages of this invention will be in part apparent and in part pointed out hereinafter and in the accompanying drawings, wherein:

FIGURE I is a front elevation attitude taken in most part in vertical central section of a device according to this invention;

FIGURE II is essentially a left end view of the structure of FIGURE I, sectioned along line II—II of FIGURE I;

FIGURE III is a plan view of the structure of FIGURE I; and

FIGURE IV is a perspective of a calibration shutter used in the structure of FIGURE I.

In the following description, the main structure is illustrated in FIGURE I, with FIGURES II and III being other views of the same device, and FIGURE IV being an illustration of a part of the device of FIGURE I, shown only in section therein. Thus, the following description applies to the entire device with like elements having like reference numbers applied thereto, in the various drawings.

This turbidimeter is an instrument designed to measure, as an example, Tyndal light, i.e., light diffused at 90°±10° from a main beam, from the surface of particles suspended in a liquid, with water as a specific example. Municipal water systems are of a particular concern with respect to this invention. The quantity of light thus diffused is a direct measure of the concentration of particles in suspension and therefore a direct measure of turbidity.

The device comprises a base or fluid tank system 10 with an apertured cover 11 thereon and secured thereto, and a top light system housing 12 removable from the base, and this is removable from the combination of the base and the base apertured cover 11.

The liquid tank unit 10 is in the form of an inner tank 13 within an outer tank 14, in a weir arrangement for flowing liquid to provide a continuous measurement of turbidity. Measurement can also be made on a batch basis, if desired, in a single, still liquid tank. In the tank system 10 there is a water inlet 15 at the lower part of the tank which enters water directly into the inner tank 13 at the bottom thereof through a system at the right hand end of the drawing which is more clearly seen in dotted lines in FIGURE III.

The inner tank 13 is formed by a sleeve-like arrangement vertically disposed, with a bottom, outwardly extending lip as at 16 which extends throughout the periphery of the device and which defines the bottom of the outer tank 14.

The liquid enters as at 15 and leads to a transverse passage indicated at 17 which extends in both lateral directions and to the edge of the device and then opens forward into the lower part of the inner tank 13. It so opens at the lateral edges of this tank just under the shelf or shoulder formed by the outwardly extending bottom lip of the inner tank 13. Thus, the incoming fluid first enters at a laterally central position, splits, and extends laterally to both sides and turns forward again and then actually enters the inner tank 13, in each case adjacent the particular side wall, and in each case under the lip 16 of the inner tank formation. Thus, turbulence of the incoming liquid is dispersed as these jets of water flow along the bottom portion of the inner tank underneath the lips 16 on both sides, until the water is thoroughly into the tank. Thus, no harmful turbulence is transmitted up through the liquid to the measuring area or to the surface of the liquid. The surface of the liquid is a meniscus, dotted line 18, slightly above the top edge of the inner tank 13. The liquid flows over the top edge of the inner tank 13 in weir fashion, down into the bottom of the outer tank 14 which extends circumferentially around the inner tank 13, and then out exit 19, at the lower portion of the left hand side of the outer tank 14.

In this fashion, a continuous flow of water may be entered into the inner tank, flowed up over the top thereof with a continuously changing yet undisturbed surface, at a constant level. Foreign matter is swept out and a clean surface at a constant level is maintained. A time constant of 30 seconds is realized without turbulence in the measuring area or at the surface.

Over the top of the tank system 10 there is the rectangular cover 11 which is mounted on the top edge of the outside of the outer tank 14. The inner tank 15 reaches not quite so high, so that the fluid can flow over the edge from the meniscus 18 without impinging on the under side of the cover 11. Thus, the inner tank 13 provides an open top fluid tank so a liquid surface can be available to light penetration and exiting without passing through any windows with which the liquid under measurement comes in contact. Thus, the problem of dirtying of such windows and the consequent errors in light transmission and measurement is done away with in this device. The cover 11 has substantial apertures therein, on the left side at 20 for the entrance of light to the surface of the liquid from above and on the right hand side at 21 for the exiting of light from the liquid from below up through the surface. Thus, the light transmission in and out of this body of liquid is from above down deep into the liquid as a beam, and Tyndal light exits from beneath and deep within the liquid, through the liquid surface from below and then upwards through the aperture 21 in the cover 11.

The cover 11 is secured to the outer liquid tank 14 by means of an outwardly flaring side edge lip 22 on the top of the outer tank 14, and a downwardly extending side edge lip 23 from the cover 11. Screws 24 pass through the downwardly extending lip 23 of the cover and under the top outwardly flaring lip 22 of the top edge of the outer tank 14.

In FIGURE I in the central portion of the under side of the cover 11 there is a baffle 25 which extends down from the plate and into and below the level of the meniscus 18. Thus, scattered light reflections cannot travel along the top of the liquid surface from left to right as shown, from one side to the other, and error from this source is thus avoided.

The upper housing light system 12 is secured to the bottom portion by means of an outwardly flaring bottom lip 26 as seen in FIGURE II. On the side portions, the periphery of the bottom forms a bottom channel which fits on the edge curvature of the cover plate 11. The light system unit 12 is then clipped to the bottom of the depending lip 23 of the plate 11 by snap clips as indicated at 27. These clips are not shown in FIGURES I and III, but may be placed along the device in pairs as desired according to the indication of FIGURE II.

The light system housing 12 is formed with its top in a series of steps with risers as indicated at 28 and 29. This provides, vertically, recess formations on the top side for an optical system as indicated at 30 and a photomultiplier system as indicated at 31. The same steps provide recess formations within the housing on the under side of the top thereof for a calibration unit as indicated at 32 and a photomultiplier as indicated at 33.

The light system starts at the optical system 30 with a tubular mounting comprising a lamp 2 within the tube, a light collimating lens 3, a sometimes used color filter 34, and a pair of polarizing filters at 35 which are adjustable in a rotating fashion to vary the polarization and volume of light to be passed therethrough. The optical system is mounted on a step-down portion of the upper surface of the top of the upper housing by any suitable threaded arrangement as generally indicated at 36. A mirror is provided on the inner end side wall as at 37.

The calibrating unit 32 depending from the underside of the top of light system housing 12 comprises a depending support plate 38 with an opening 39 transversely therethrough. Light approaches this calibrating unit from the left, ordinarily as reflected off the surface of the liquid in the tank 13, to first pass through a diffusion plate 40 which acts to more surely bring the greater part of the beam into the apertures of the calibrating unit so that the necessity of extreme accuracy of direction of the light beam is avoided. This calibration may be passed directly from the optical system to the calibration unit through a light rod, if desired. A support member 41 is mounted on the depending plate 38 with a transverse aperture 42 therein in alignment with the aperture 39 of the depending plate 38 and a lateral opening therethrough in which is mounted a shutter 43 also shown in FIGURE IV. The shutter 43 has various size openings therethrough for alignment with the openings 39 and 42 in the calibration unit. Thus, the shutter may selectively allow different amounts of light through according to calibration needs or it may shut off the light entirely by blocking the holes with a blank portion of the shutter. On the right side of the depending plate 38 as shown in the drawings there is a rhomboid prism 44 for altering the path of the beam of light coming through the calibration unit into a parallel path lower down so that it may be suitably impinged upon the photomultiplier 43 as indicated.

Accordingly, the path of travel of the light beam is from the light bulb 2 down through the optical tube to be collimated by the lens 3, color filtered by the filter 34 if necessary, polarized by the filters 35, which are rotationally adjustable, and reflected off the mirror 37 to impinge on the surface of the liquid in the tank 13. At this point, part of the beam is refracted down deep into the body of the liquid, and part is reflected upward towards the calibration means 32. The direct beam in this instance is not measured, but rather the laterally dispersed beams are measured so that scattered light at approximately 90° to the beam over a substantial area is travelled upward through the liquid and through the aperture 21 in the cover 11 and then applied to the photomultiplier 33.

In this fashion, very low ranges of turbidity may be measured because of the substantial area deep within the liquid which may contain a great number of particles from which light may be dispersed. This area may be much greater than actual surface area which might otherwise be used. The light beam enters the liquid from above through an aperture but not through any window in contact with the liquid. There is a central island in the plate 11, and the light travels beneath it and then the transverse dispersion from this main beam travels upward on the other side of the cover island and leaves the liquid without passing through a window touched by the liquid.

The instrument may be calibrated as to range by allowing a calculated amount of light to pass through the calibration unit 32 according to the use of the figure IV shutter 43. The photocell then has an initial unknown amount of light plus a known amount through the calibration device which will lead to the determination of the value of X. The span of the device may be adjusted or varied according to the adjustment of the polarizing filters 35. In such case, it is the filter nearest to the light source which is moved. The one nearest to the mirror is not moved, so that the polarization impinging on the water does not change, merely the amount of light. By using the calibration device 32 in combination with variations of the polarizing filter 35 position, many desired variations in span and range may be achieved.

The photomultiplier system 31 includes the photomultiplier tube 33 assembled in a unit 45 which involves an associated resistor network enclosed in the housing and kept moisture free by small package of calcium chloride as a drying agent.

Power sources (not shown) are provided for a high voltage D.C. (750 v. D.C.) as a supply to the photomultiplier and a light source step-down transformer (not shown). A readout device (not shown) may be used with this instrument and may contain a voltage divider for electrically adapting to range changes quickly, and a 0 to 100 mv. indicator or recorder. It may be noted here that if the liquid were free of suspended solids there would be no reflected light and no diffused or dispersed light and the photomultiplier output would be effectively zero.

For calibration, the power supply is turned on but the light source is left off. Any dark current or leakage current is now apparent and the indicator is zeroed. The light source is now turned on sending the indicator upscale to some unspecified point. Next the calibration shutter is opened to any one of the indicated increments. The increase in measurement is again noted. Now apply the equation $y=MX+b$ to find span or full scale.

As an example, assume the pen initially goes to 25% of scale and upon opening the shutter it goes to 75% of scale. The shutter opening may be .5 t.u.

$$y=MX+b$$
$y=$ percent of scale
$M=$ slope or rise/run
$X=$ t.u.
$b=y$ intercept Now, the $y$ intercept has been set at zero reducing the equation to $$y/X=M=\text{rise/run}$$

In the case at hand the rise=50% of scale and the run=.5 t.u. Therefore, if an increase of 50% corresponds to .5 t.u., then 100% of scale must equal 1 t.u. and then, by proportion, the turbidity of the unknown water must be .25 t.u.

Assuming the turbidity of the water is expected to run from 0 to 1.5 t.u., and to keep the pen on scale a 0–2 t.u. span is used. In this case, the water which is known to be 1/4 t.u. would correspond to 12½% of scale. The polarized filter is then closed down until the pen shows 12½%. The span of the instrument is now 0–2 t.u. This may be checked at any time by using a .5 t.u. or 1 t.u. mark on the calibration shutter. This would cause an increase of 25% or 50% respectively. In a similar manner the instrument may be calibrated to any desired span from 0–.5 to 0–25 t.u.

This invention therefore provides a new and useful turbidimeter.

As many embodiments may be made of this invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:
1. An instrument for measuring turbidity comprising a first fluid tank, a second and open top fluid tank within said first fluid tank, a fluid input to, and distributed and dispersed about the bottom of said second tank, and a fluid output from the bottom of said first tank whereby a continuous flow through said tanks provides a continuously self cleaning surface of fluid in a weir effect from said second tank to said first tank.

a cover on said first tank, an opening in said cover for light access to the surface of fluid in said second tank, another opening in said cover for light exit from fluid in said second tank, and a surface reflection light shield depending from said cover between said openings and sufficiently to extend below the surface of fluid in said second tank, a top housing over said tanks and said tank cover, a mirror on an inside vertical wall of said top housing, a light source and lens system therefor located outside of said top housing and mounted in a somewhat vertically disposed portion of said housing to direct a beam of light through said top housing to said mirror at an angle of 70 degrees with respect to said mirror, the relative locations and positions of said mirror and said first opening in said tank cover being such that light reflected from said mirror passes through said first opening and into fluid in said tank at a refracted angle in said fluid of the order of 45 degrees from a vertical, said lens system including a pair of light polarized relatively adjustable lenses as an intensity adjustment for the instrument, a photomultiplier unit mounted on said top housing and lying mostly above said housing with a photomultiplier light sensitive receptor extending down through said top housing into a position and location to receive 90 degree light scattering from a light beam in said fluid from said light source when such 90 degree light refractively exits from said fluid through the surface thereof, and travels upward through said light exit opening in said tank cover, to said photomultiplier receptor within said top housing, and range calibration means for said instrument comprising optical means mounted within said top housing and above said tank cover, with means for selectively receiving a predetermined amount of light from said light beam from said light source system, and for directing said selected predetermined amount of light to said photomultiplier receptor.

References Cited
UNITED STATES PATENTS

| | | | |
|---|---|---|---|
| 1,971,443 | 8/1934 | Exton | 88—14 |
| 2,380,216 | 7/1945 | Carter | 88—57 |
| 2,455,966 | 12/1948 | Ackley | 88—14 |
| 3,013,466 | 12/1961 | Kaye | 88—14 |
| 3,065,665 | 11/1962 | Akhtar | 88—14 |

FOREIGN PATENTS

| | | |
|---|---|---|
| 461,628 | 2/1937 | Great Britain. |

JEWELL H. PEDERSEN, *Primary Examiner.*

DAVID H. RUBIN, *Examiner.*

A. A. KASHINSKI, *Assistant Examiner.*